Patented Apr. 22, 1947

2,419,348

UNITED STATES PATENT OFFICE 2,419,348

ARSENIC COMPOUNDS OF PHENYL-HYDRAZO-NAPHTHOL SULFONIC ACIDS

Ernst A. H. Friedheim, New York, N. Y.

No Drawing. Application October 31, 1942,
Serial No. 464,079

4 Claims. (Cl. 260—440)

This invention relates to hydrazo-compounds and their derivatives, said compounds and derivatives containing residues of naphthalene sulfonic acid derivatives and residues of phenyl-arsenic compounds containing trivalent and pentavalent arsenic. The compounds according to this invention comprise one or two systems of the following general formula:

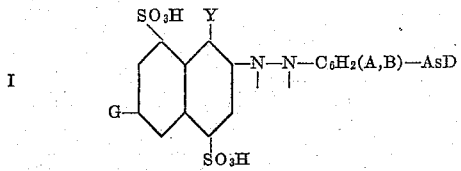

I

In this formula G is selected from the group consisting of H and —SO₃H;

C₆ represents a benzene nucleus;

Y is selected from the group consisting of —OH, —NH₂, —NHacyl, —NHalkyl, —NHCO₂alkyl, —O—alkyl, —O—CO₂—alkyl, —O—acyl;

A and B may be the same or different and are selected from the group consisting of H, OH, —O—alkyl, —O—acyl, Cl, Br, F, I, —NO₂, alkyl, —NH₂, —NHalkyl, —NHacyl, —NH—NH₂, —NH—NHacyl, —Nacyl—NH₂, —Nacyl—NHacyl, —NH—NH—alkyl, —NalkylNH₂, —Nalkyl—NH—alkyl;

D is selected from the group consisting of —O₃H₂, =O, =halogen₂, =S, radicals of the formula

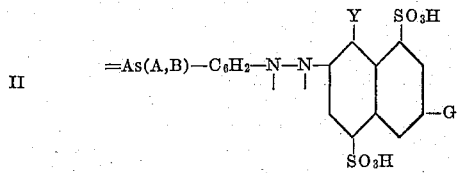

II and radicals of the formula =(SR)₂, wherein R stands for any aliphatic or aromatic cyclic group capable of carrying a —SH group, such as thioglycolic acid and thiophenol;

The group —AsD may be in ortho-, meta- or para-position to the hydrazo-linkage;

The nitrogen atoms of the hydrazo-linkage may be connected by the free valencies indicated in the above Formulas I and II to H atoms or to a stabilizing radical or radicals taking the place of one or both of these H atoms and being capable of stabilizing the hydrazo-compounds. Both N atoms of the hydrazo-linkage may be connected to one and the same stabilizing radical or each N atom may be connected to an individual stabilizing radical. In the latter case these radicals may be the same or different. The mono- or divalent stabilizing radicals are selected from the group consisting of alkyl, mono- and divalent acyl radicals, residues of aliphatic or cyclic carbonyl radicals, and aliphatic or cyclic isocyanate radicals.

The compounds embodying the present invention are colorless or slightly yellowish substances, readily soluble in water, insoluble in benzene and chloroform.

They have a distinct therapeutic effect in diseases caused by certain spirochetes and protozoa. They diffuse readily into the body fluids, including the liquid media of the eye and the cerebrospinal fluid. They have no toxic effect on the central nervous system.

The hydrazo-compounds according to the present invention may be prepared by appropriate reduction of the corresponding azo-dyes, preferably by means of Zn or Fe dust, in alkaline solution. The corresponding azo-dyes may be prepared:

(a) By coupling according to classical methods an aromatic diazo-compound containing a radical of tri- or pentavalent arsenic with the desired naphthol- or naphthyl-amine-derivative;

(b) By condensing a phenylhydrazine-derivative containing a radical of tri- or pentavalent arsenic radical with a 1,2-naphthoquinone-sulfonic acid derivative;

(c) By coupling a diazotized β-naphthylamine-sulfonic acid derivative with a phenyl-arsenic derivative containing a tri- or pentavalent arsenic radical and a hydroxy- and/or amino-group.

Hydrazo-compounds according to this invention, in which the nitrogen atoms of the hydrazo-linkage carry an H atom, reduce ammoniacal silver solution. They are in alkaline and neutral aqueous solution relatively sensitive to molecular oxygen, by which they are oxidized to the corresponding azo-dyes.

Such hydrazo-compounds may be stabilized against the action of molecular oxygen by substituting for the H atom of the hydrazo-linkage a stabilizing radical. Thus, stabilized hydrazo-compounds may be obtained by mono- or di-alkylation and acylation, the stabilized compounds containing for example, the following linkages between the naphthalene and benzene nucleus:

—N(COCH₃)—N(COCH₃)—
—N(CO₂alkyl)—N(CO₂alkyl)—
—N(COC₆H₅)—N(COC₆H₅)—
—N(COCH₃)—NH—
—N(CO₂alkyl)—NH—
—N(COC₆H₅)—NH—

The hydrazo-compounds containing H atoms in the hydrazo-linkage may also be stabilized by condensation with carbonyl compounds, such as aliphatic or cyclic aldehydes and ketones. Such carbonyl compounds, which form divalent radicals, may condense with one hydrazo-compound to form derivatives carrying a linkage between the naphthalene and benzene nucleus, such as in the case of acetaldehyde:

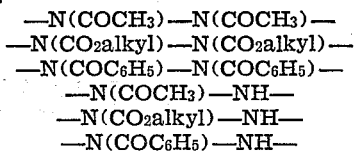

or one carbonyl compound may combine with 2 hydrazo derivatives so that the linkages between naphthalene and benzene nucleus take, for example by reaction with formaldehyde, the following form:

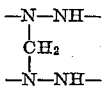

or

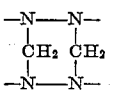

Two molecules of a hydrazo derivative may also be linked together by reaction with an acid chloride of a dibasic acid such as malonyl dichloride according to the following scheme:

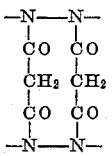

or

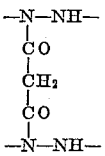

Such an acid dichloride derived from a dibasic acid may also condense with one molecule of a hydrazo-compound to form, i. e. in the case of malonyl dichloride, a stabilized hydrazo derivative of the following type:

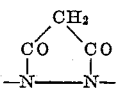

Stabilization may further be obtained by reacting the hydrazo-compounds with isocyanic acid and its derivatives to form compounds carrying i. e. the following groups:

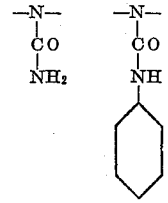

and furthermore, by addition of acetylenedicarboxylic acid esters, to form compounds i. e. according to the following formula:

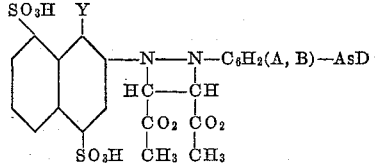

I denote all such radicals taking the place of H atoms of the hydrazo-linkage and being capable of stabilizing hydrazo-compounds embodying my present invention, by linking said radicals to the N atoms of the hydrazo-linkage, as stabilizing radicals.

Example I.—53.1 g. of the red azo-dye obtained by coupling diazotized arsanilic acid with α-naphthol-4,8-disulfonic-acid, according to U. S. Patent No. 2,244,293 is dissolved in 700 cc. of N/1 NaOH and treated with 100 g. of Zn dust, until the red solution is decolorized. The reaction mixture is filtered from the Zn sludge, acidified with acetic acid and salted out. The monosodium salt of [benzenearsonic acid (4)]-(1-hydrazo-2)-[naphthol (1)-disulfonic acid (4,8)] forms then a yellowish precipitate, which may be crystallized out of warm water in an atmosphere of hydrogen. The new compound forms a slightly yellowish crystalline powder, which is soluble in water, insoluble in chloroform and ether. Its alkaline solution turns red on shaking with air.

Replacing in the foregoing example arsanilic acid by 4-oxy-3-aminophenylarsonic acid and proceeding otherwise in the same manner, [(4)-oxyphenylarsonic acid] - (3-hydrazo-2) - [naphthol(1)-disulfonic acid(4,8)] is obtained.

Example II.—61.2 g. of the azo-dye obtained by coupling diazotized α-naphthol-amino-(2)-trisulfonic acid-(4,6,8) with p-hydroxy-phenylarsinic acid (or by coupling diazotized (3)-amino-(4)-hydroxy-phenylarsinoxide with α-naphthol-(4,6,8)-trisulfonic acid) is dissolved in 15 parts of 20% aqueous ammonia and treated with a current of H₂S, until the solution is decolorized. On cooling the ammonium salt of [(4)-hydroxy-phenylarsinsulfide]-(3-hydrazo-2)-α - naphthol-(4,6,8) trisulfonic acid forms a yellowish precipitate, which is filtered off and dissolved in 5 parts of 10% acetic acid. The sodium salt is precipitated from this solution by salting out with sodium chloride. The corresponding arsinoxide is obtained by dissolving the new compound in an excess of aqueous sodium hydroxide in an atmosphere of hydrogen, acidifying with acetic acid and salting out with sodium chloride.

Example III.—50 g. of the azo-dye obtained by coupling p-diazobenzenearsinoxide with α-naphthol-(4,8)-disulfonic acid are dissolved in 700 cc. of N/1 NaOH and treated with iron powder, until the solution is decolorized. The reaction mixture is quickly filtered from the iron sludge and shaken in an atmosphere of hydrogen with 45 g. of benzoylchloride, which is added in successive small portions. On acidification with acetic acid and saturation with sodium chloride the sodium salt of the following acid forms a white, slightly yellowish precipitate of the formula:

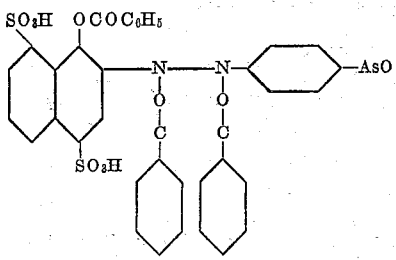

*Example IV.*—53.2 g. of [benzenearsonic acid (4)]-(1-hydrazo-2)-[naphthol - (1) - disulfonic acid-(4,8)] prepared according to Example 1, are dissolved in 800 cc. of N/1 NaOH and treated, in an atmosphere of hydrogen, with 35 g. of chlorocarbonic ethylester. On acidification with acetic acid and saturation with sodium chloride, the sodium salt of the following acid forms a white, faintly yellowish precipitate:

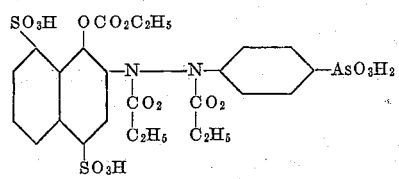

which may be obtained in a white, crystalline form, by recrystallization out of warm water.

*Example V.*—60 g. of the disodium salt of [benzenearsonic acid (4)]-(1-hydrazo-2)-[α-naphthol-(4,8)-disulfonic acid] prepared according to Example 1, are dissolved in 400 cc. of air-free water and shaken, in an atmosphere of hydrogen, in the presence of 100 g. of finely divided calcium carbonate with 16 g. of benzoylchloride, at a temperature not exceeding 20° C. On acidification with acetic acid and on addition of sodium acetate, the monosodium salt of the following acid forms a white precipitate, which is filtered off:

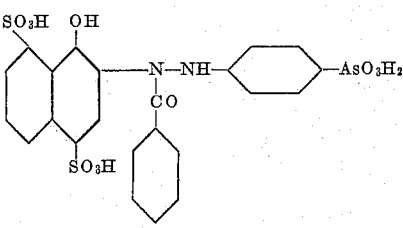

washed with concentrated sodium acetate solution, alcohol and ether.

By replacing in the above example the benzoylchloride by 60 cc. of a 20% solution of malonyldichloride in chloroform, a compound of the following formula is obtained:

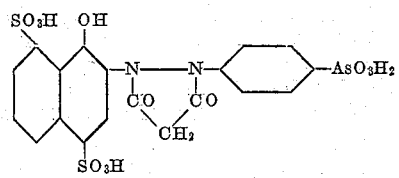

*Example VI.*—53.4 g. of [benzenearsonicacid (4)]-(1-hydrazo-2)-[α-naphthol - (4,8) - disulfonic acid] are dissolved, with addition of 25.8 g. of sodiumbicarbonate, in 300 cc. of water, and shaken in an atmosphere of hydrogen with 5 g. of acetaldehyde. On acidification with acetic acid and cooling, a white precipitate of the following construction is formed, filtered off, washed with ice-cold dilute acetic acid, alcohol and ether:

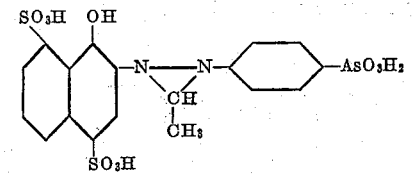

By replacing in the foregoing example the acetaldehyde by 25 cc. of neutral 30% formaldehyde, a white precipitate of the following formula is formed:

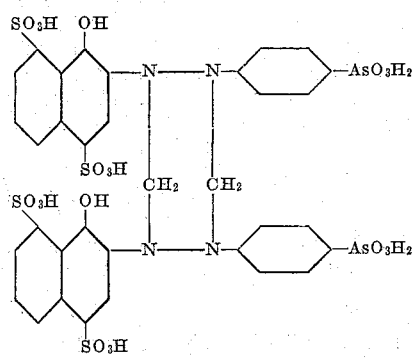

*Example VII.*—1 part of [(4)hydroxy-phenylarsinoxide(1)] - (3 - hydrazo - 2) - [α - naphthol-(4,8)disulfonic acid], prepared according to a procedure in all ways analogous to that described in Example 2, is suspended in 10 parts of acetic anhydride. The reaction mixture is shaken at a temperature not exceeding 15° C. 25 parts of ice are added. The suspended material is then filtered off and washed with acetic acid, alcohol and ether. The white substance thus obtained is [(4)hydroxy - phenylarsinoxide(1)] - (3-monoN-acetyl - hydrazo) -2-[α - naphthol - 4,8)disulfonic acid].

By running the acylation with an excess of acetic anhydride at a temperature of 80°–100° C., the corresponding diacetyl-derivative is obtained, i. e. a[(4)-hydroxy-phenylarsinoxide-(1)]-(3-di-N-acetyl - hydrazo) -2-[α-naphthol-(4,8) - disulfonic acid].

*Example VIII.*—53.3 g. of [benzenearsonic acid (4)]-(1 - hydrazo - 2) - [naphthol(1) - disulfonic acid(4,8)] is dissolved with 25.8 g. of sodium carbonate in 500 cc. of water and treated with 25 g. of phenylisocyanate. On acidification with acetic acid and cooling, a white precipitate of the following constitution is formed and filtered off:

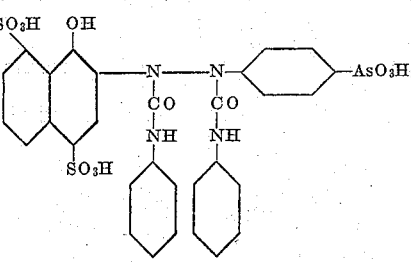

*Example IX.*—53 g. of the azo-dye obtained by coupling diazotized m-arsanilic acid with α-naphthylamine-4,8 disulfonic acid are dissolved in 500 cc. of N/1 NaOH and treated with 100 g. of iron powder until the reaction mixture is decolorized. The reaction mixture is filtered and shaken with 30 g. of dimethyl-sulfate, which is added in successive portions. On acidification with acetic acid and saturation with sodium chloride, a white precipitate is obtained, which is filtered off and washed with concentrated aqueous sodium acetate, alcohol and ether, and which is of the following formula:

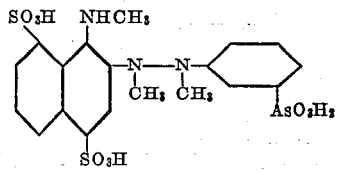

*Exmaple X.*—One of the azo-dye obtained by coupling diazotized (1) hydroxy-(2) diazo-naphthalene-(4,8) disulfonic acid in alkaline solution with (4) oxy-phenyl-arsinoxide is dissolved in 12.7 parts of N/1NaOH and treated with 1.5 parts of Zn dust, until the reaction mixture becomes colorless. The reaction mixture is then filtered, acidified with acetic acid and salted out. A slightly yellowish precipitate of [(1)naphthol-(4,8)disulfonic acid] - (2 - hydrazo-3') - (4)hydroxyphenylarsinoxide(1) is obtained, which is filtered off, washed with concentrated aqueous sodium acetate, alcohol and ether.

*Example XI.*—One part by weight of 4,4'-dihydroxy - arsenobenzene-3,3'-bis -[azo-2]-naphthol-(1)-disulfonic-4,8-acid prepared as described in my prior Patent No. 2,235,478 is dissolved in 15 parts B. W. of aqueous 2.8% bicarbonate of soda solution and subjected to the action of 4 parts B. W. of Zn dust at ordinary room temperature. The compound formed has the formula:

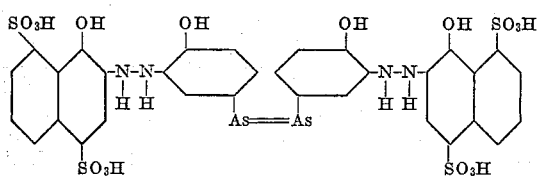

It can be precipitated from the solution by acid and can be stabilized by redissolving in dilute aqueous alkali and reacting it i. e. with chlorocarbonic methylester.

*Example XII.*—A stabilized hydrazo - compound containing an arseno-group is obtanied by reducing an acetylated trivalent arsenic compound prepared according to Example VII with sodium hydrosulfite to the corresponding arsenoderivative.

Furthermore, stabilized hydrazo-compounds according to the present invention may be obtained by reducing stabilized hydrazo-compounds containing pentavalent arsenic radicals of the type described in Example IV with sodium hydrosulfite to the corresponding arseno-compounds.

*Example XIII.*—An azo-compound of the formula:

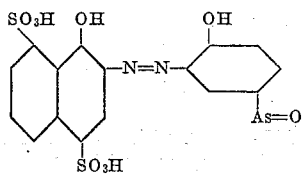

is prepared by coupling diazotized 4-hydroxy-3-aminophenyl-1-arsenic oxide with 1-naphthol-4,8-disulfonic acid.

The azo-compound of the above formula may be converted into the corresponding hydrazo-compound by treatment with zinc dust in alkaline solution. This hydrazo-compound may be stabilized by treatment with phenylisocyanate according to Example VIII.

In a substantially similar manner a hydrazocompound of the formula

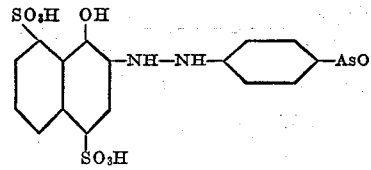

may be obtained by coupling p-diazophenylarsinoxide with α-naphthol-(4,8)-disulfonic acid to form phenylarsinoxide-(4-azo-2) - α - naphthol-(4,8)-disulfonic acid and reducing the latter compound with metal powder.

It will be understood that this invention may be carried out in numerous other specific ways than those herein set forth, and the above examples and details should be, therefore, considered as illustrative and not restrictive within the spirit of the invention as defined in the appended claims.

I claim:

1. A hydrazo-compound corresponding to the formula

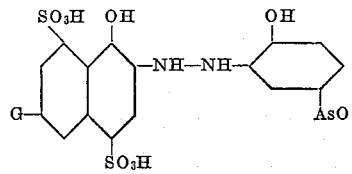

wherein G is selected from the group consisting of H and SO3H.

2. A hydrazo-compound corresponding to the formula

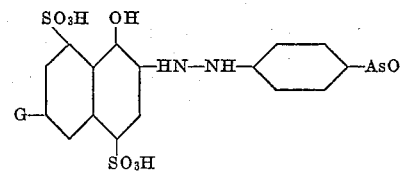

wherein G is seelcted from the group consisting of H and SO3H.

3. A hydrazo-compound corresponding to the formula

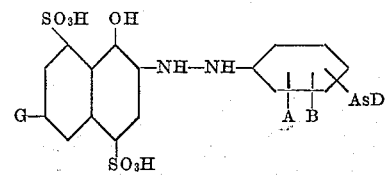

wherein G is selected from the group consisting of H and SO3H; A and B are selected from the group consisting of H and OH; and —AsD is selected from the group consisting of arsonic acid radicals, —As=O and arseno-radicals.

4. A hydrazo-compound of the general formula

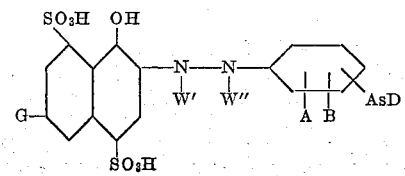

wherein G is selected from the group consisting of H and SO$_3$H; A and B are selected from the group consisting of H and OH; and —AsD is selected from the group consisting of arsonic acid radicals, —As=O and arseno-radicals, and W' and W" are selected from the group consisting of hydrogen and alkyl radicals.

ERNST A. H. FRIEDHEIM.

REFERENCES CITED

The following references are of record in the file of this patent:

UNITED STATES PATENTS

| Number | Name | Date |
|---|---|---|
| 1,932,152 | Zitcher et al. | Oct. 24, 1933 |
| 2,295,565 | D'Alelio et al. | Sept. 15, 1942 |
| 2,244,293 | Friedheim | June 3, 1941 |
| 2,235,478 | Friedheim | Mar. 18, 1941 |

OTHER REFERENCES

Raiziss et al., "Organic Arsenic Compounds" (1923), p. 257.

Gattermann, "The Practical Methods of Organic Chemistry" (1896), pp. 184 and 185.